US010349260B2

(12) United States Patent
Khan et al.

(10) Patent No.: US 10,349,260 B2
(45) Date of Patent: Jul. 9, 2019

(54) SYSTEM AND METHOD FOR A DYNAMIC CONNECTIVITY UPDATE SYSTEM

(71) Applicant: Plasma Computing Group, Inc., Dallas, TX (US)

(72) Inventors: Yasser Khan, Dallas, TX (US); Mahesh Ramu, Dallas, TX (US)

(*) Notice: Subject to any disclaimer, the term of this patent is extended or adjusted under 35 U.S.C. 154(b) by 95 days.

(21) Appl. No.: 15/721,363

(22) Filed: Sep. 29, 2017

(65) Prior Publication Data

US 2019/0104397 A1  Apr. 4, 2019

(51) Int. Cl.
*H04W 4/00* (2018.01)
*H04W 8/00* (2009.01)
*H04L 29/08* (2006.01)
*H04W 40/24* (2009.01)
*G06F 8/65* (2018.01)

(52) U.S. Cl.
CPC ......... *H04W 8/005* (2013.01); *H04L 67/306* (2013.01); *H04L 67/36* (2013.01); *H04W 40/248* (2013.01); *G06F 8/65* (2013.01); *H04L 67/12* (2013.01)

(58) Field of Classification Search
CPC ..... H04W 8/005; H04W 8/65; H04W 40/248; H04W 67/306; H04W 67/36; H04W 67/12
USPC ........................................ 370/338
See application file for complete search history.

(56) References Cited

U.S. PATENT DOCUMENTS

| 8,335,842 | B2 | 12/2012 | Raji et al. | |
| 9,449,229 | B1* | 9/2016 | Laska | G06K 9/00765 |
| 9,501,915 | B1* | 11/2016 | Laska | H04N 7/181 |
| 2011/0196755 | A1 | 8/2011 | Landa | |
| 2014/0244001 | A1 | 8/2014 | Glickfield et al. | |
| 2015/0019342 | A1* | 1/2015 | Gupta | G06Q 10/20 705/14.66 |
| 2015/0334474 | A1 | 11/2015 | DelloStritto et al. | |
| 2017/0328997 | A1* | 11/2017 | Silverstein | G01S 7/41 |
| 2017/0329449 | A1* | 11/2017 | Silverstein | G01S 13/56 |
| 2018/0012462 | A1* | 1/2018 | Heitz, III | G08B 13/19606 |
| 2018/0012463 | A1* | 1/2018 | Chaudhry | G06K 9/00771 |
| 2018/0124549 | A1* | 5/2018 | Samuelsson | H04W 4/023 |

* cited by examiner

*Primary Examiner* — Thai D Hoang
(74) *Attorney, Agent, or Firm* — Vinson & Elkins LLP (57) ABSTRACT

The present disclosure provides a system and method for interacting with low-powered devices. The system includes a server and a gateway device that connect and communicate with low-powered devices. The system and method connects a user through a gateway device to a low-powered device by temporarily loading a profile for the low-powered device onto the gateway device. The profile of the low-powered device contains the necessary connection information to facilitate a connection. The profile of the low-powered device is only temporarily stored on the gateway device and is deleted from the memory of the gateway device after a connection is established.

13 Claims, 6 Drawing Sheets

○ CHANNEL INFO  ○ CONNECTION  ○ IDENTIFICATION  ● DATA MAPPING  ○ ANALYTICS  ○ COMMANDS  ○ RESOURCES

BACK

EDIT DEVICE CHANNEL WIZARD:

IN THIS WIZARD, YOU WILL CREATE A SETUP TEMPLATE FOR A SPECIAL DEVICE GROUP, OR CHANNEL. PLEASE FILL OUT THE FOLLOWING INFORMATION FOR A SPECIFIC SET OF DEVICES. THIS WILL SAVE YOUR USERS TIME AND TECHNICAL QUESTIONS LATER WHEN CONNECTING THEIR SPECIFIC DEVICES.

☒ FIXED SCHEMA — 444

○ MANUAL  ⊙ DATA SAMPLE — 446

PLEASE SELECT DATA SAMPLE TYPE GIVEN BELOW TYPE

⊙ STRING  ○ XML  ○ JSON  ○ BYTES — 448

PLEASE ENTER DATA SAMPLE OF YOUR DEVICE TO GET SCHEMA

$$358901044957089,4001,2000/00/00,00:00:00,0.000000,0.00000,0,0,0,0,0,688,0,0,0,0,0,13.8,27,0,35.00## — 450

| START TEXT | PARAMETER SEPARATOR | KEY VALUE PAIR SEPARATOR | END TEXT |
|---|---|---|---|
| $$ | , | | ## |
| 452 | 454 | 456 | 458 |

GENERATE SCHEMA — 460

| IMEI | ☒ |
|---|---|
| 462 | |

▶ IMEI — 466

| EVENT_NUMBER | ☐ |
|---|---|
| 464 | |

▶ INT — 468

SYSTEM AND METHOD FOR A DYNAMIC CONNECTIVITY UPDATE SYSTEM

BACKGROUND

Traditionally, when two wireless devices seek to connect with each other, the first device has to obtain a device profile that contains the definitions of the second device before being able to connect to it. The second device's device profile provides all the necessary information for the first device to connect with it. The device profile is a set of definitions that are associated with that particular device and can include the GATT Profile and MAC address of that device. For example if the first device is a wireless router located in a home or office and the second device is a smartphone, in order for the wireless router to connect to the smartphone, the wireless router has to obtain a device profile from the smartphone.

The continued growth of the internet has seen not just the proliferation of a large number of smartphones, but has also brought about proliferation of a large number of various other connected devices. Although equipped with a wireless radio, these connected devices that have proliferated tend to be low-powered, low-energy devices as compared to a smartphone or a notebook computer. One category of these types of devices are Bluetooth low energy (BLE) devices. A more specific example of these various connected devices includes sensors such as those found in the Texas Instruments SensorTag®, which include an IR sensor, a humidity sensor, a gyroscope, an accelerometer, a magnetometer, a barometric pressure sensor, a temperature sensor, and a battery/voltage sensor. These connected devices also tend to have much less on-board memory as compared to a smartphone (megabytes of memory as compared to multiple gigabytes of memory). As such, a need has emerged for a system and method to reduce or eliminate the storage space required on a connected device to store its device profile.

Let us take the example of a corporation that sells home automation kits. These kits include a wireless router that functions as a gateway device, and a set of connected home automation devices such as a security alarm, a door lock, and a flood sensor. The traditional approach has been to store a pre-determined set of remote electronic device definitions and connecting information on the wireless router as software so as to allow the wireless router to connect to the devices within the pre-determined set. The definitions of the security alarm, the door lock, and the flood sensor are stored on the gateway as software because they are sold as a part of the home automation kit. Let us say this corporation has sold 100,000 such kits in the market to different consumers.

A common need for a consumer in this situation is the necessity to add new home automation devices at their homes as the products are designed and introduced, let us say a gas leak detector. However, adding this new device requires that the gateway be capable of connecting to and communicating with the new device, here a gas leak detector. Since the original pre-defined software of the set of devices did not include the gas leak detector, an update of the pre-defined set of software is needed. This means that the corporation has to send a software update to the gateways either remotely, or by physical means. Let us say that 500 customers are interested in adding the new gas leak detector. Further, at the same time, let us say that 1000 other customers want to add a different smoke detector. The current method of tackling this problem of diverse needs is that a larger than necessary update needs to be transferred from the corporation's server down to each customer's gateway because each gateway needs to support all the devices approved for use with the corporation's home automation service even though certain consumers are using only a subset of all the devices supported. As the number of supported devices increases and each succeeding update becomes larger, updates become a very daunting task for the corporation to keep up with.

One problem that has emerged with the proliferation of various connected devices is that simply there are a larger number of them when used in the applications they are designed for. The number of connected devices can be in the range of several hundreds to thousands of connected devices. Where in the traditional scenario a wireless router is connected to a smartphone in a one-to-one connection, there are now applications where a large number of low-powered sensors are connected to a single wireless router where the wireless router functions as a hub and the low-powered sensors are the ends of a spoke in a hub-and-spoke configuration. Because the large number of low-powered sensors are often slave devices and the wireless router controlling them is a master device, there is also a scenario where a second master device is switched in to take over control of the large number of low-powered sensors originally connected to the first master device. In this scenario, in order for the second master device to connect to the large number of low-powered sensors, each of the device profiles for the low-powered sensors must be fed to the new second master device. This consumes a significant amount of energy and can also needlessly take up precious computing resources on the side of the master device.

Another problem that occurs because of the way software is developed and implemented is the need for periodic (if not frequent) updates of devices. Frequent updates of software are not limited to the software running a piece of hardware (i.e., the smartphone's operating system or the low-powered sensor's firmware), but also applies to the individual pieces of software running on a device (e.g. a specific application running on the smartphone or the low-powered sensor). When a piece of software is updated by the software developer, the current method involves transferring the software from a server controlled by the software developer over the internet to the wireless router then to the device operating the software. This transfer is triggered by the developer's server informing the software on the device that there is a new version of the software or the software checking with the server whether there is a new version of the software and requesting that the software be transferred over.

However, despite the extraordinary level of connectivity between the software developer and their devices, there are still many instances where the server is not able to immediately contact the device to inform it that a new update is available. This problem can occur for a variety of reasons but one cause is that the device's owner may not keep a device constantly online. This problem is also caused by the design of low-powered sensors that enter into "sleep mode" so as to reduce power consumption. Also, low-powered sensors are not directly connected to the internet and hence a central server as they are connected via a wireless router and the wireless router may not always be connected to the internet. The result is that the software update may not reach the individual devices in a timely manner and at any time, devices or applications belonging to the same software developer may be operating different versions of a piece of software. Where software updates may contain a patch to a serious security flaw, this is a serious problem.

The invention being discussed solves this problem by not storing any device definition on the gateway. Instead, all device definitions are stored on a remote server that the gateway is connected to. When the gateway starts up, it downloads a list of device definitions that are relevant for the user that is using this gateway. The gateway then looks for the devices and connects to them. If the customer changes his list of devices, he/she updates a customer profile on the server and the gateway will now use the new set of definitions that are relevant. Every single customer could have a different set of devices, but the gateways will support each of them without the corporation having to send firmware updates.

An additional scenario is, if the definitions of existing devices changes, the erstwhile method will again need to issue firmware updates, whereas the new invention will be able to handle this with a single device definition update on the server that applies to all customers that use this device.

For the foregoing reasons, there is a need for a dynamic connectivity system where one wireless device does not need to obtain the device profiles of a large number of wireless devices before being able to connect to them.

SUMMARY

As disclosed and described herein, in one aspect thereof, includes a system and method for interacting with low-powered devices. The system includes a server and a gateway device that connect and communicate with low-powered devices. The system generates a user profile for a user on the server, then adds a low-powered device profile on the server. The low-powered device profile includes connection information and a device definition for the low-powered devices. The gateway device receives the user profile from the server to log-in the user, after which the low-powered device profile for the low-powered device is downloaded to the gateway from the server. The low-powered device profile for the low-powered device is stored in a memory portion of the gateway. A zone within connectivity range of the gateway is searched to detect the low-powered device. Upon detection, a validation is performed to confirm that the low-powered device detected corresponds to the low-powered device profile stored on the gateway. The gateway is connected to the low-powered device based on the connection information and the device definition within the low-powered device profile. The low-powered device profile stored in the memory portion of the gateway is then deleted.

One aspect of the presently disclosed system and method is that the connection information is temporarily stored in the memory portion of the gateway and deleted each time the gateway is shut-down, powered-off, or when the user is logged-off the gateway. Connection and identification of the low-powered device is achieved by the device definition of the low-powered device, which includes a friendly name, a friendly channel, a general attribute profile and a media access control address.

Another aspect of the presently disclosed system and method is a graphical user interface within the gateway for performing the connection, identification, issuance of commands, and data mapping to a low-powered device. One portion of the graphical user interface is a connection interface for enabling connection to the low-powered device. Another portion of the graphical user interface is an identification interface for setting up how to identify the low-powered device by using a device identifier (such as an IMEI of the device identifier or a UUID), a definition of the data type, and an IMEI of the data type.

BRIEF DESCRIPTION OF THE DRAWINGS

These and other features, aspects, and advantages of the present disclosure will become better understood with regard to the following description, appended claims, and accompanying drawings where:

Like reference numerals are used to describe like parts in all figures of the drawings.

DESCRIPTION OF THE PREFERRED EMBODIMENTS

Figure 1:
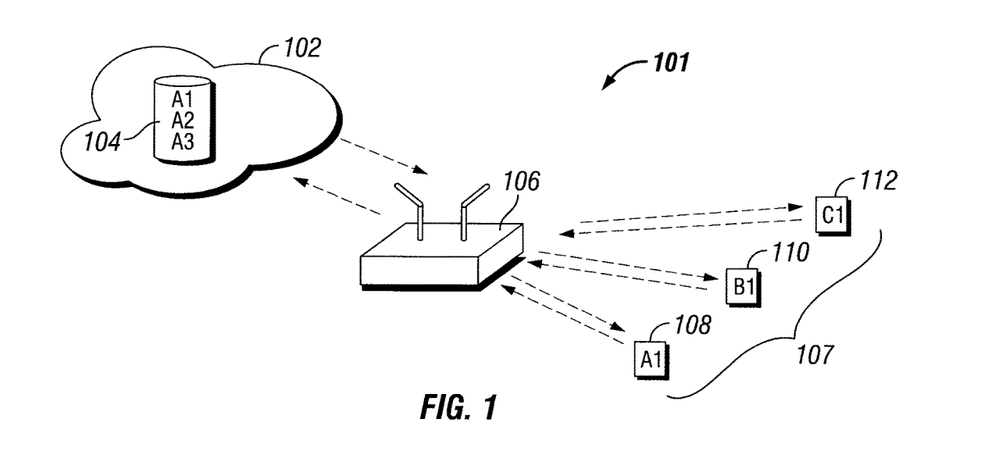
FIG. 1 is a block diagram illustrating the interconnectivity between the server, a gateway, and various low-powered devices according to one embodiment of the invention.

The present invention can be better understood by the following discussion of the manufacture and use of certain preferred embodiments. Like reference numerals are used to describe like parts in all figures of the drawings As illustrated in FIG. 1, wireless low-powered devices 107 (A1 108, B1 110, and C1 112) operate in a network environment 101. The low-powered devices may be any number of connected devices such as BLE devices that connect to each other via a low-powered device communications protocol; examples include but are not limited to the Bluetooth communications protocol. The low-powered devices 107 communicate with a gateway device 106. The gateway device 106 is a central device operating to send and receive data from each individual low-powered device 106 within the network environment 101. The gateway may be a router, a smartphone or any number of potential devices. It may also be a single function of a device that performs a multitude of other functions. However, the gateway device's 106 key feature is its ability to send and receive communications from the low-powered devices 107.

The gateway 106 is connected to a server 104. The server 104 may be located in a local area network (not shown) or even physically connected to the gateway device 106 by a single cable (not shown), although more likely than not it is remotely located in the cloud 102.

Figure 2:
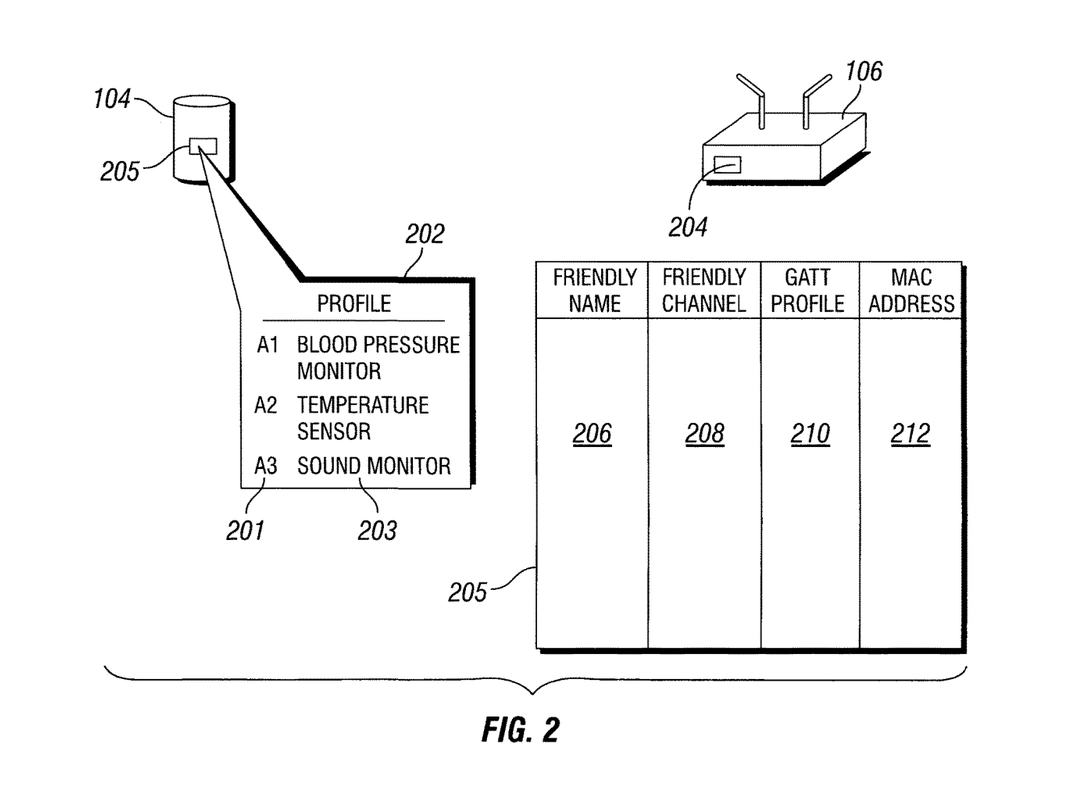
FIG. 2 is a diagram illustrating the profile as stored in the server and the data relating to each low-powered device as they are stored in the gateway according to one embodiment of the invention.

FIG. 2 illustrates a profile 202 as stored in a memory 205 of the server 104. The profile 202 may contain various types of low-powered devices 107 known to be operating in the network environment 101. The profile 202 lists the types of low-powered devices by a friendly name 201 and a friendly channel 203. In one example, the friendly names of the low-powered devices 107 are A1, A2 and A3. The friendly channel of the low-powered devices 107 are blood pressure sensor, temperature sensor and sound monitor respectively. After the profile 202 of the low-powered devices 107 are downloaded to the gateway device 106, they are temporarily stored in the memory location 204. They may be stored in the format of a table 205, listed as a friendly name column 206, a friendly channel column 208, a General Attribute ("GATT") profile column 210, and a Media Access Control ("MAC") address column 212 of the low-powered devices.

Figure 3:
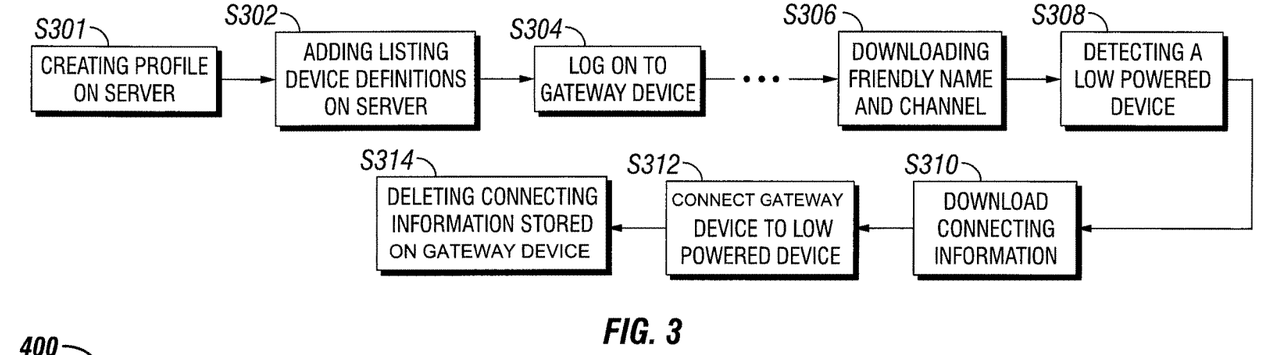
FIG. 3 is a flowchart for an updating algorithm according to one embodiment of the invention.

FIG. 3 is a flowchart illustrating one embodiment of the present invention. At the server 104, the profile 202 is created during a step S301. During the step S302, devices known to be active in the network environment 101 are added to the profile 202. The server 104 then initiates communication with the gateway device 106 and begins a log-on process to gain full access to the gateway device 106 in step S304. Once log on to the gateway device 106 is complete, the server 104 begins to download the profile 202. The profile 202 is saved as a new profile 205 temporarily in the cache 204 or some other temporary memory location of the gateway device 106. In step S308, the gateway 106 begins scanning the network environment 101 to detect low-powered devices 107 operating in the network environment 101. Once the scan is complete, the gateway device 106 begins comparing the low-powered devices 107 detected to the low-powered devices listed in the table 205. Once a match is determined between the low-powered devices 107 detected in the network environment 101 and those listed in the profile 205, the gateway device 106 begins to download the connecting information for the low-powered devices 107 in step S310 and a set of commands for interacting with the low-powered device 107. The connecting information includes the GATT profile and the MAC address of the low-powered devices 107.

Using the connecting information downloaded from the server 104, the gateway device 106 begins connecting to the low-powered devices 107 in step S312. The connection is established using the GATT profile and MAC address information. After a connection is established, the gateway device 106 conducts other processing over the connection with the low-powered devices 107 including updating the profile of the low-powered device. When all processing is complete, the connecting information temporarily stored as the profile 205 in the cache 204 is deleted in step S314. The deletion of the connecting information temporarily stored as the profile 205 in the cache 204 occurs when the gateway 106 is shut-down or powered-off. The connecting information is not permanently retained in the memory of the gateway device 106. Although the steps of S301 through S314 are described in sequence and continuous in time, no limitation is implied that the steps all occur in sequence, that all steps must occur in every instance, or that all steps must occur continuously in time.

Figure 4A:
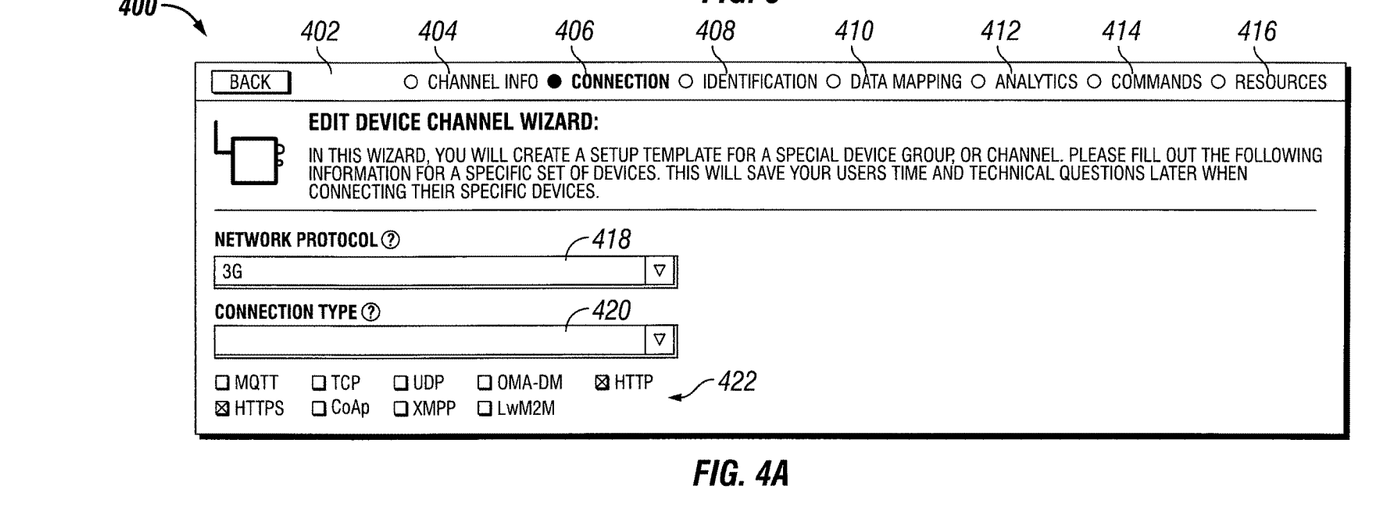
FIG. 4A is a depiction of an exemplary user interface for setting up the connection to a low-powered device or device group.

FIGS. 4A through 4D are exemplary depictions of a graphical user interface (GUI) for performing the connection, identification, issuance of commands, and data mapping to a low-powered device or device group. The GUI can be designed to be operable from the gateway device 106 but does not necessarily have to be operated from the gateway device 106. FIG. 4A is a depiction of an exemplary graphical user interface (GUI) for a configuration interface 400 for setting up the connection to a low-powered device or device group. A menu bar 402 is laid-out at the top of the configuration interface 400. In the menu bar 402, selection can be made between a channel info interface 404, a connection interface 406, an identification interface 408, a data mapping interface 410, an analytics interface 412, a commands interface 414 and a resources interface 416.

When the connection interface 406 is selected, drop down selection boxes are available for a network protocol 418 and a connection type 420. Further, tick-box selection options 422 are available for the selection of the connection based on a specific communication protocol.

Figure 4B:
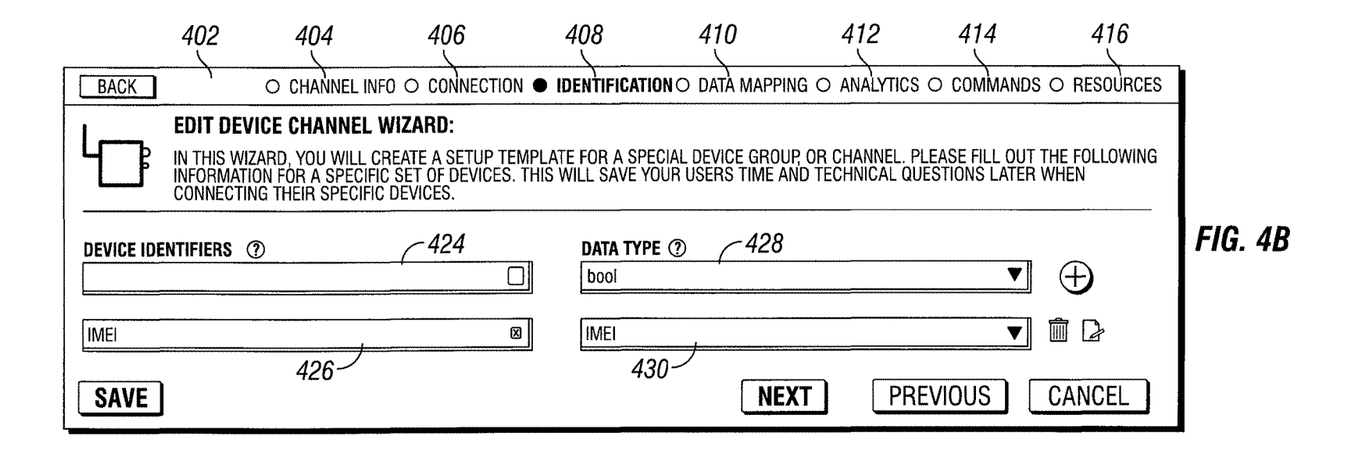
FIG. 4B is a depiction of an exemplary user interface for setting up how to identify a low-powered device or device group.

FIG. 4B is a depiction of an exemplary user interface for setting up how to identify a low-powered device or device group. When the identification interface 408 is selected, drop down selection boxes are available for a device identifier 424, an IMEI of the device identifier 426, a definition of the data type 428, and an IMEI of the data type 430.

Figure 4C:
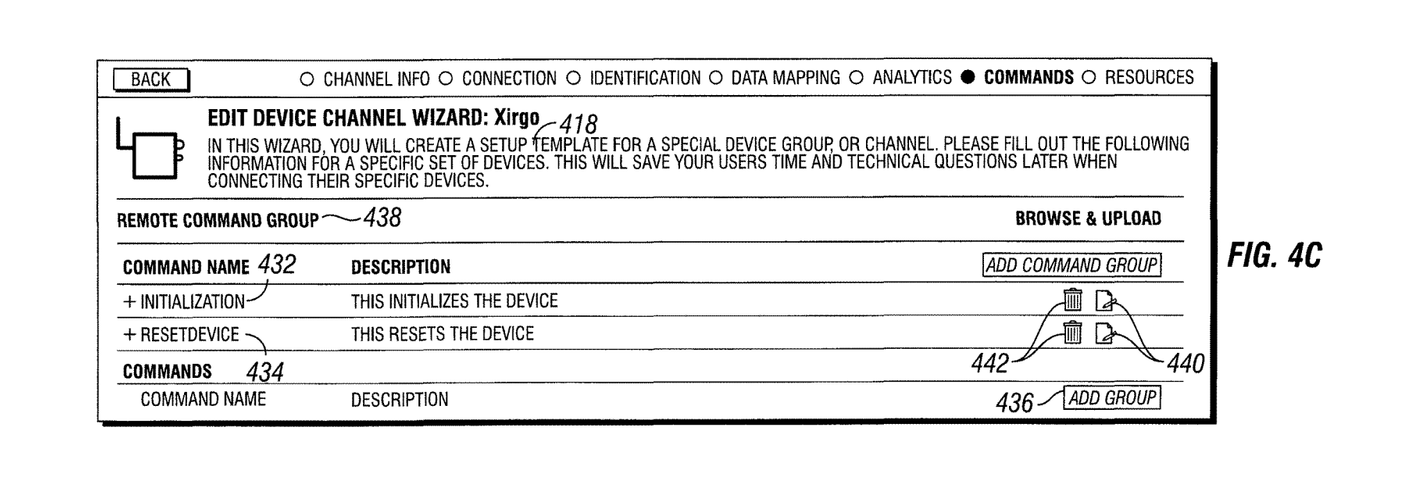
FIG. 4C is a depiction of an exemplary user interface for setting up the commands that can be issued to a low-powered device or device group.

FIG. 4C is a depiction of an exemplary user interface for setting up the commands that can be issued to a low-powered device 108 or a group of low powered devices 107. When the commands interface 414 is selected, an initialization command 432 and a reset device command 434 are available by default. Additional commands can be added through a add command button 436. Commands that are similar can be grouped into a remote command group 438. Each command can be edit by clicking on an edit button 440 or deleted through the use of a delete button 442.

Figure 4D:
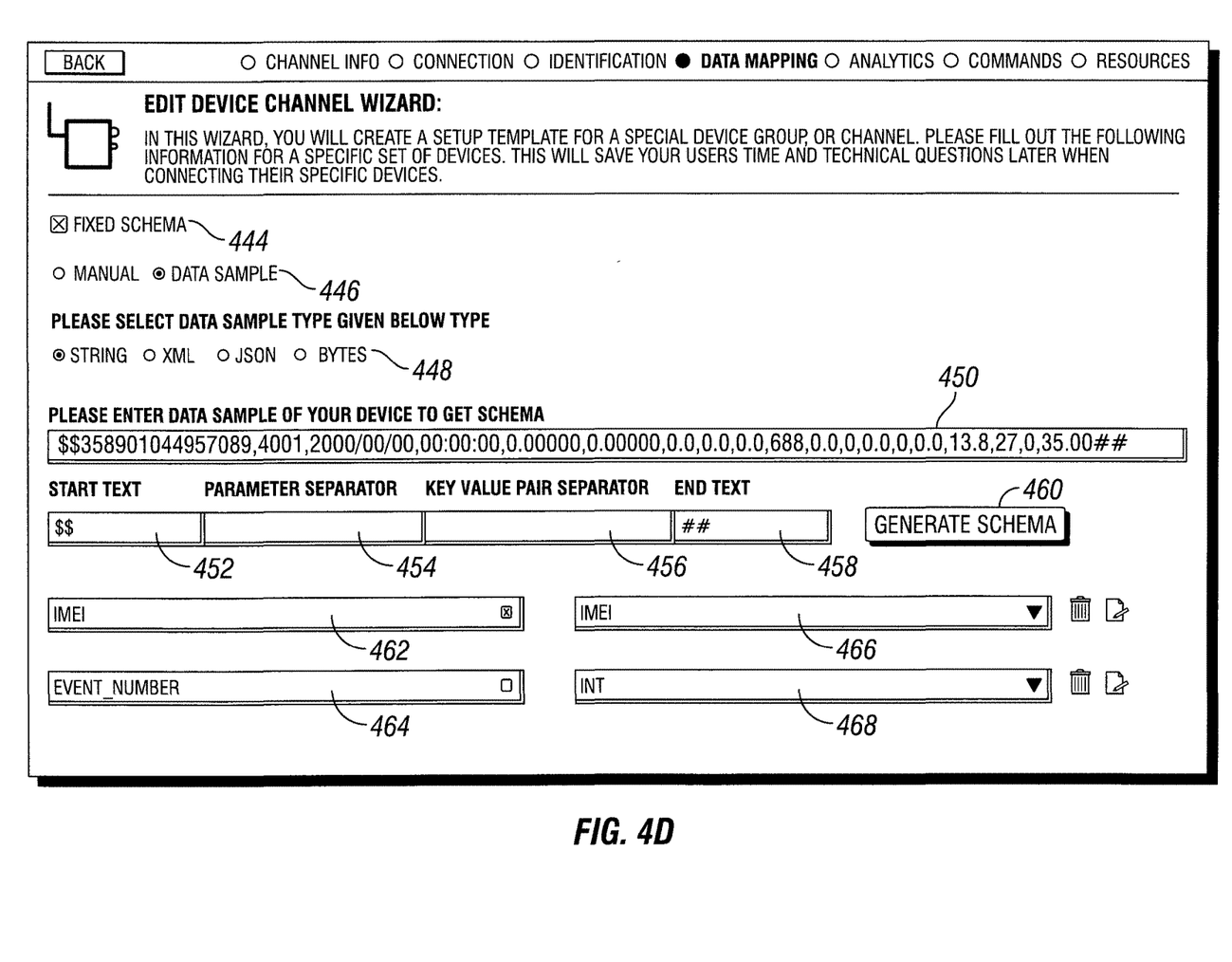
FIG. 4D is a depiction of an exemplary user interface for setting up the schema of a low-powered device or device group.

FIG. 4D is a depiction of an exemplary user interface for setting up the data mapping of a low-powered device or device group. When the data mapping interface 410 is selected, options are available for the generation of a schema. A selection can be made as to whether it is a fixed schema 444. A data sample radio button 446 allows for the determination of whether the data is manual or a data sample. If the data sample type radio button 446 is selected, the data sample type selection 448 can be used. If an external data sample is provided, it can be inputted manually through a data sample entry 450. Alternatively, a schema can be generated by entering a start text 452, a parameter separator 454, a key value pair separator 456, and an end text 458 by selecting a generate schema button 460. An IMEI identifier 462, an event number 464, a IMEI 466, and a int value selector 468 are also provided.

Figure 5:
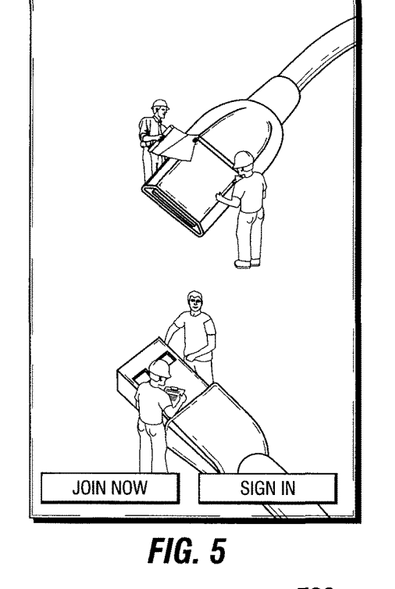
FIG. 5 is a depiction of a graphical user interface of a log-on screen of a gateway device.
Figure 6:
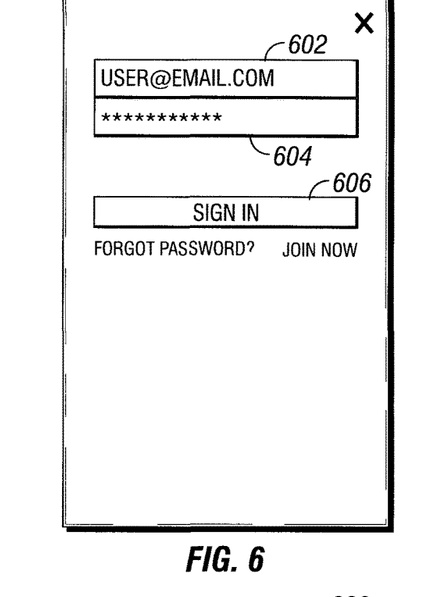
FIG. 6 is a depiction of a graphical user interface of a log-on screen of a gateway device.

FIG. 5 is a depiction of a graphical user interface of a log-on screen of a gateway device. FIG. 6 is a depiction of a graphical user interface of a log-on screen of a gateway device with the entry of a log-on 602 and a password 604. Log-on into the GUI is initiated by clicking of a sign-in button 606.

Figure 7:
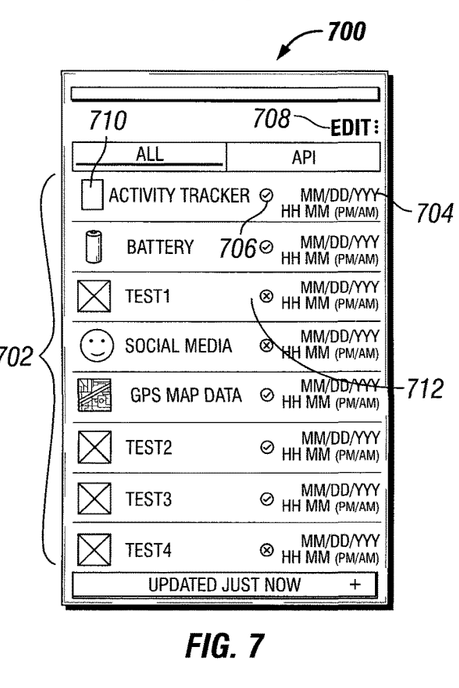
FIG. 7 is a depiction of a graphical user interface of a device management screen of a gateway device showing the status of on-boarded devices.
Figure 8:
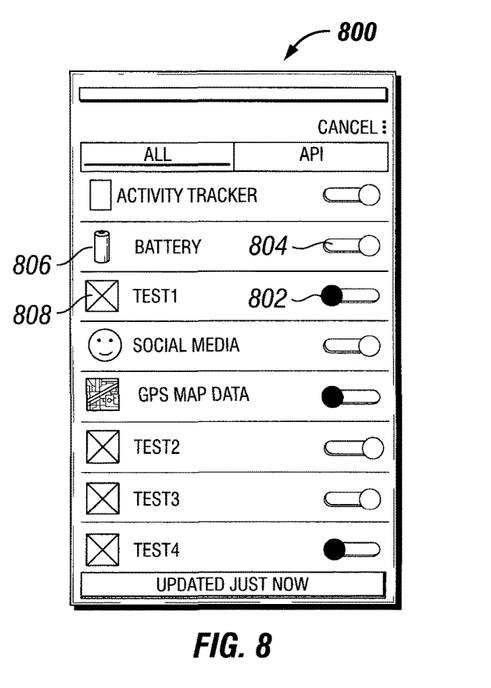
FIG. 8 is a depiction of a graphical user interface of a device management screen of a gateway device.

FIG. 7 is a depiction of a graphical user interface of a device management screen of a gateway device showing the status of on-boarded devices. The device management screen 700 lists various device instances 702 of low-powered devices 107 currently recognized by the gateway device 106. Each of the device instances 702 and the instance of an activity tracker device 810 has a date and time indicator 704 and an on-board status indicator 706. For example, when the instance of the tracker device 710 is connected to the gateway device 106, the on-board status indicator 706 displays a green check mark. An on/off interface 800 for switching the channel instance from OFF to ON or vice versa of the activity tracker device 710 can be accessed by clicking on an edit button 708.

FIG. 8 is a depiction of a graphical user interface of a device management screen of a gateway device showing the on/off interface. A device 808 has an accompanying slider 802 that can be in an OFF or an ON position. The slider 802 is set to OFF as shown by it being placed in the left most position. A device 806 has as its accompanying slider a slider 804. The slider 804 is set to the ON position in the right most position. When a slider is moved from the OFF position to the ON position, the device instance starts communicating with the server 104 to get the device commands and then processes these commands to communicate with the gateway device 106 to enable or disable the sensors based on the commands defined.

Figure 9:
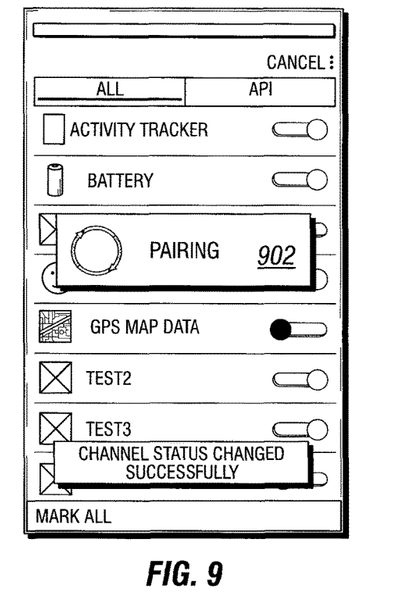
FIG. 9 is a depiction of a graphical user interface of a device management screen of a gateway device when pairing with a low-powered device.

FIG. 9 is a depiction of a graphical user interface of a device management screen of a gateway device showing pairing with a low-powered device. When the gateway device 106 attempts to connect with a device instance, a pairing status indicator 902 appears. If connection to the device instance is successful, an "all sensors activated" message appears.

The gateway device 106 sends commands to a connected device instance based on instructions generated by commands stored in the server 104. The commands are pushed from the server 104 to the gateway device 106 and instructs the gateway device 106 to dynamically communicate with connected device instances.

A relevant portion of the commands contains instructions for generating commands sent from the gateway device 106 to a connected device instance. The relevant portion of the commands instructs the gateway to scan for BLE devices within range of the gateway. If a low powered device 107 is detected, the gateway will attempt to match the MAC address of the low powered device 107 to a MAC address defined on the cloud. If the MAC address of the low powered device 107 is determined to be a match, the low powered device 107 will be connected. Once the low powered device 107 is successfully connected, a call back function is initiated.

For certain low powered devices 107 where a pairing is required, a pairing is performed. However, for some low powered devices 107 that do not require pairing, a connection can immediately be initiated. A device can be paired but not connected.

The callback function pulls the specific set of commands for the particular connected device in the cloud and sends the set of commands to the gateway. One purpose of the callback function is to enable local notifications and remote notifications. Once the parent function is completed and communication with the low powered devices 107 is successful and all device services are discovered, the callback function itself is called and another function is executed to enable sensors within the low powered devices 107. After all sensors relevant to the low powered devices 107 are enabled and local notifications are enabled according to the command sent from the cloud, the call back is used to receive data from the low powered devices 107. The data received from the low powered devices 107 can be displayed on the UI and/or sent to the cloud as data.

During the course of the operation of the BLE device, characteristic values for each device service will change. The notifications that were enabled earlier serve the purpose of updating the user interface through a separate function every time a characteristic value changes.

Figure 10:
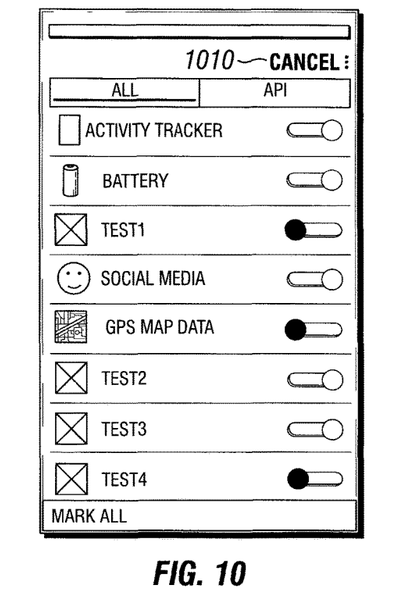
FIG. 10 is a depiction of a graphical user interface of a device management screen of a gateway device showing how to access a viewing mode.

FIG. 10 is a depiction of a graphical user interface of a device management screen of a gateway device showing how to access a viewing mode. This interface allows the user to return to the on-boarded devices screen. A viewing mode can be accessed through selection of a cancel button 1010 that takes the user back to the device management screen 700 listing various device instances 702 currently recognized by the gateway device 106.

Figure 11:
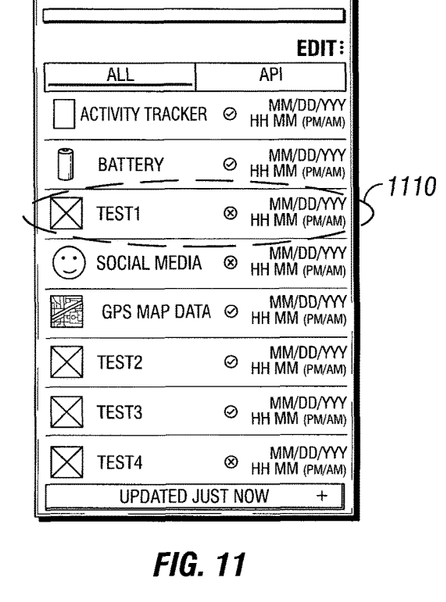
FIG. 11 is a depiction of a graphical user interface of a device management screen of a gateway device showing the status of on-boarded devices.

FIG. 11 is a depiction of a graphical user interface of a device management screen of a gateway device showing the status of on-boarded devices. A particular device instance can be selected by clicking on it. Clicking on the device instance for a tracking device 1110 allows the user to gain access to data parameters being communicated from the connected device instance.

Figure 12:
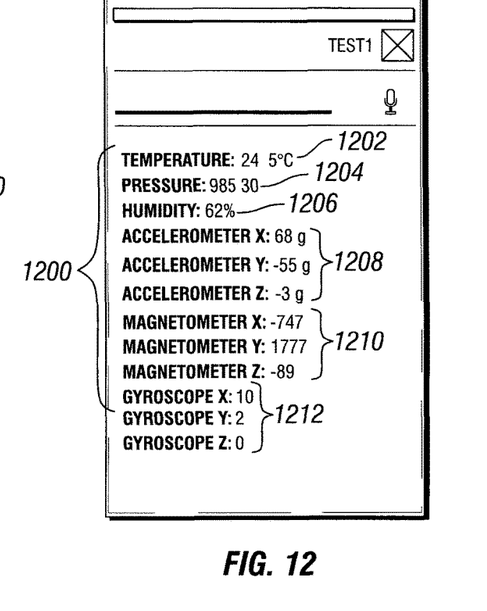
FIG. 12 is a depiction of a graphical user interface of a device management screen of a gateway device showing the various data parameters flowing from a connected device.

FIG. 12 is a depiction of a graphical user interface of a device management screen of a gateway device showing the various data parameters flowing from a connected device. The connected tracking device 710 has data parameters 1200. The data parameters 1400 are temperature 1202, pressure 1204, humidity 1206, an accelerometer x, y, z dimensions 1208, an magnetometer x, y, z dimensions 1210, and a gyroscope x, y, z dimensions 1212.

Other alterations and modifications of the invention will likewise become apparent to those of ordinary skill in the art upon reading the present disclosure, and it is intended that the scope of the disclosure made herein be limited only by the broadest interpretation of the appended claims to which the inventor is legally entitled.

Unless otherwise specifically stated, the terms and expressions have been used herein as terms of description and not terms of limitation. There is no intention to use the terms or expressions to exclude any equivalent of features shown and described or portions thereof and this invention should be defined in accordance with the claims that follow.

What is claimed is:

1. A system for interacting with low-powered devices, comprising:
   a server containing at least one processor configured to:
      generate a user profile for a user on the server;
      add a low-powered device profile on the server, wherein the low-powered device profile includes connection information and a set of commands for interacting with the low-powered device;
   a gateway containing at least one processor configured to:
      receive the user profile from the server to log-in the user;
      download the low-powered device profile for the low-powered device to the gateway from the server;
      store the low-powered device profile for the low-powered device in a memory portion of the gateway;
      search a zone within connectivity range of the gateway to detect the low-powered device;
      validate that the low-powered device detected corresponds to the low-powered device profile stored on the gateway;

connect the gateway to the low-powered device based on the connection information and the device definition within the low-powered device profile;

interact with the low-powered device by issuing commands and receiving responses using information provided by the server; and delete the low-powered device profile stored in the memory portion of the gateway.

2. The system of claim 1, wherein the connection information is temporarily stored in the memory portion of the gateway and deleted each time the gateway is shut-down, powered-off, or when the user is logged-off the gateway.

3. The system of claim 1, wherein the device definition of the low-powered device includes a friendly name, a friendly channel, a general attribute profile and a media access control address.

4. The system of claim 1, wherein the gateway includes a graphical user interface for performing the connection, identification, issuance of commands, and data mapping to a low-powered device.

5. The system of claim 4, wherein the graphical user interface includes a connection interface for enabling connection to the low-powered device.

6. The system of claim 4, wherein the graphical user interface includes an identification interface for setting up how to identify the low-powered device by using a device identifier, a definition of the data type, and an IMEI of the data type.

7. A method for interacting with low-powered devices, comprising:

generating a user profile for a user on the server;

adding a low-powered device profile on the server, wherein the low-powered device profile includes connection information and a set of commands for interacting with a low-powered device;

logging in the user to a gateway with the user profile;

downloading the low-powered device profile for the low-powered device to the gateway from the server;

storing the low-powered device profile for the low-powered device in a memory portion of the gateway;

searching a zone within connectivity range of the gateway to detect the low-powered device;

validating that the low-powered device detected corresponds to the low-powered device profile of stored on the gateway;

connecting the gateway to the low-powered device based on the connection information and the device definition within the low-powered device profile;

interacting with the low-powered device by issuing commands and receiving responses using information provided by the server; and deleting the low-powered device profile stored in the memory portion of the gateway.

8. The method of claim 7, wherein the connection information is temporarily stored in the memory portion of the gateway and deleted each time the gateway is shut-down, powered-off, or when the user is logged-off the gateway.

9. The method of claim 7, wherein the device definition of the low-powered device includes a friendly name, a friendly channel, a general attribute profile and a media access control address.

10. The method of claim 7, wherein the gateway includes a graphical user interface for performing the connection, identification, issuance of commands, and data mapping to a low-powered device.

11. The method of claim 10, wherein the graphical user interface includes a connection interface for enabling connection to the low-powered device.

12. The method of claim 10, wherein the graphical user interface includes an identification interface for setting up how to identify the low-powered device by using a device identifier, a definition of the data type, and an IMEI of the data type.

13. A non-transitory computer-readable medium comprising:

instructions for generating a user profile for a user on a server;

instructions for adding a low-powered device profile on the server, wherein the low-powered device profile includes connection information and a device definition for a low-powered device;

instructions for logging in the user to a gateway with the user profile;

instructions for downloading the low-powered device profile for the low-powered device to the gateway from the server;

instructions for storing the low-powered device profile for the low-powered device in a memory portion of the gateway;

searching a zone within connectivity range of the gateway to detect the low-powered device;

instructions for validating that the low-powered device detected corresponds to the low-powered device profile of stored on the gateway;

instructions for connecting the gateway to the low-powered device based on the connection information and the device definition within the low-powered device profile;

instructions for interacting with the low-powered device by issuing commands and receiving responses using information provided by the server; and instructions for deleting the low-powered device profile stored in the memory portion of the gateway.

* * * * *